Nov. 25, 1952   V. J. EVRAETS ET AL   2,619,005
INTERMITTIENT MOVEMENT HAVING IMPROVED LUBRICATING MEANS
Filed June 13, 1949
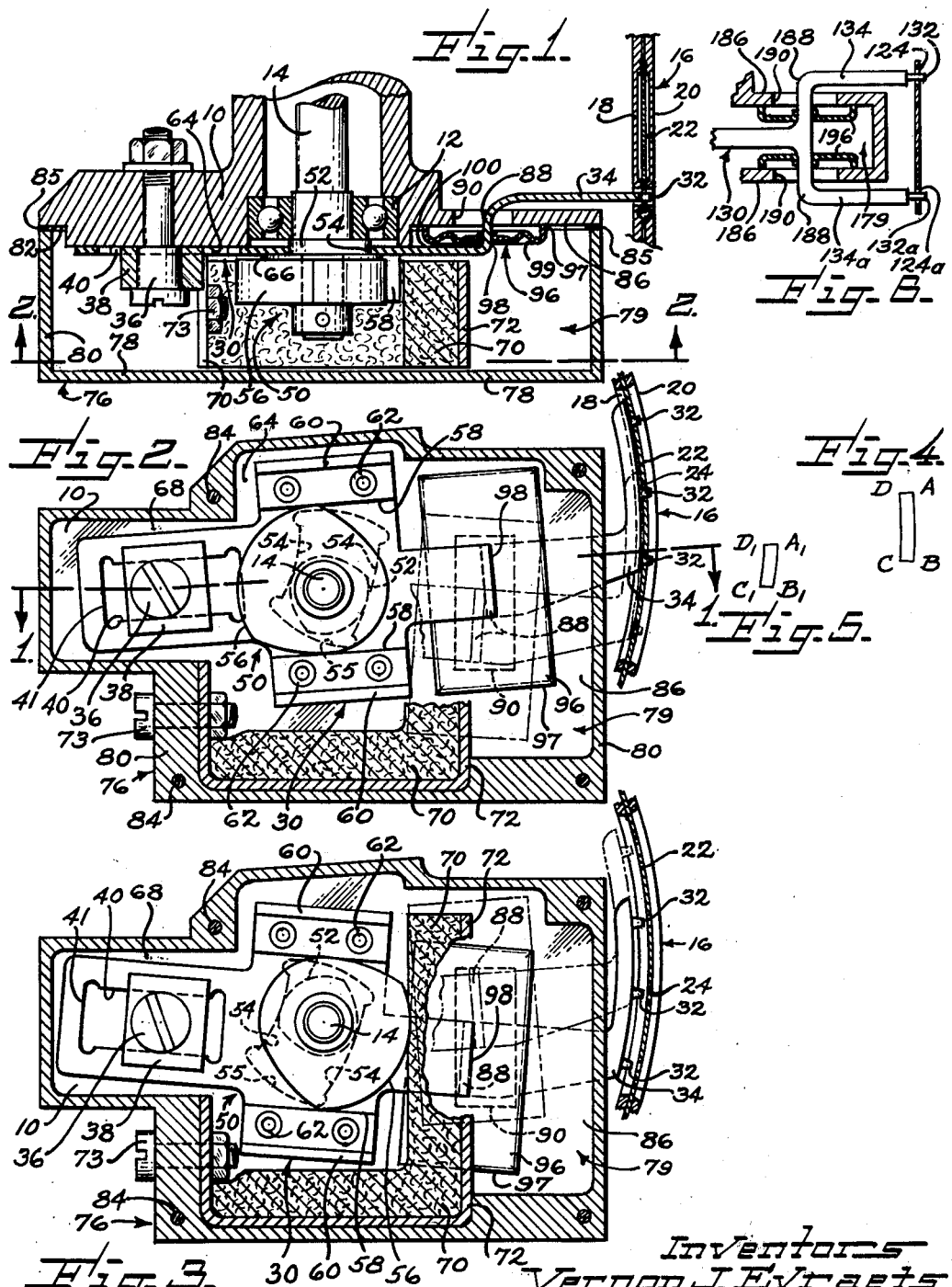

Patented Nov. 25, 1952

2,619,005

UNITED STATES PATENT OFFICE 2,619,005

INTERMITTENT MOVEMENT HAVING IMPROVED LUBRICATING MEANS

Vernon J. Evraets, Glendale, and George A. Mitchell, Pasadena, Calif., assignors to Mitchell Camera Corporation, Glendale, Calif., a corporation of Delaware Application June 13, 1949, Serial No. 98,649

1 Claim. (Cl. 88—18.4)

This invention has to do generally with intermittent film movements of the claw type, such as are used in motion picture apparatus for intermittently advancing the film.

More particularly, the invention concerns improvements in such intermittent movements providing lubrication for the moving parts with increased effectiveness and convenience.

Claw type movements ordinarily comprise a film engaging claw, which may be of the rigid or the ratchet type, mounted on a claw arm, and a suitable driving mechanism associated with the claw arm and adapted to move it through a closed cycle of film advancing motion. Many types of driving mechanisms have been proposed, some of which lead to widely different patterns of claw motion, but all have the common characteristic of moving the claw through a film advancing stroke in engagement with the film and then through a return stroke out of engagement with the film. Such action typically involves motion of the claw both longitudinally of the film, as during the film advancing stroke, and transversely of the plane of the film, as for shifting the claw between film engagement and non-engaging conditions. Thus the closed path of the claw motion lies in a plane transverse of the film and parallel to its length. The same is typically true of the motion of the claw carrying arm, at least of that portion of the arm which is close to the claw. (The partial exception when a ratchet type claw is used will be discussed below.)

The problem of properly lubricating the mechanism which produces such motion of the claw arm is complicated by the necessity of preventing lubricant from being spattered by the rapidly moving parts, and, in particular, of preventing it from spreading along the claw arm to the motion picture film. This difficulty is overcome in accordance with the present invention by providing an oil seal of novel construction between that portion of the claw arm or equivalent structure which transmits motion from the actuating mechanism to the claw and an apertured plate which surrounds that portion of the arm. The apertured plate preferably forms a wall of an oil retaining case enclosing the parts to be lubricated. Oil seals of conventional type can be provided where other moving parts, for example the driving shaft, pass through the case wall.

Among the primary advantages of an oil seal in accordance with the invention are the very simple and economical structure that is required and the low frictional losses which are entailed. Moreover, such an oil seal can readily be adapted for use with a very wide variety of claw movements, since it is not dependent for its effectiveness upon any special structure or arrangement of the claw arm actuating mechanism.

The nature of the invention, together with its further objects and advantages, will be clearly understood from the following description of an illustrative example of its embodiment in a typical form of claw movement. The scope of the invention is not intended to be limited by the particular nature of that description, or of the accompanying drawings which form a part thereof.

In the drawings:

Fig. 1 is a horizontal section on line 1—1 of Fig. 2;

Fig. 2 is a vertical longitudinal section on line 2—2 of Fig. 1, showing a preferred embodiment of the invention in a typical claw movement, with the claw shown in solid lines at the start of the pull-down stroke and in phantom lines at the end of that stroke;

Fig. 3 is a section similar to Fig. 2, but showing the claw in solid lines just after withdrawing from film engagement and in phantom lines just before advancing into film engagement;

Figs. 4 and 5 are explanatory diagrams representing respectively the paths of a claw and of a portion of the claw arm;

Fig. 6 is a schematic fragmentary section, similar to Fig. 1, but illustrating a modification.

In the drawings, the numeral 10 represents a portion of the rigid frame of a motion picture machine which may be a projector, a camera, or any device through which a film is to be fed intermittently. Frame portion 10 provides a firm support for journal bearing 12 of the driving shaft 14, through which the intermittent mechanism is driven by power means not shown. A film guide 16 is indicated schematically, formed by the opposed plates 18 and 20, which can be considered to be rigidly mounted with respect to frame 10. The motion picture film is indicated in section at 22 in film guide 16, and has perforations 24, which are shown typically as similar to the usual perforations of 16 mm. sound film.

The film moving mechanism includes a claw arm 30, which as illustrated is a generally flat plate and carries three claws 32, mounted on the forwardly protruding arm 34. The claw arm is slidingly pivoted near its rearward end on a pivot stud 36, fixed in frame 10. Pivot ways 40 are formed by the opposed parallel edges of a slotted aperture 41 in claw arm plate 30, and engage suitable grooves in the inner face of a pivot block 38, which is pivoted on stud 36.

Motion is imparted to claw arm 30 from rotation of drive shaft 14 by means of a cam mechanism 50, certain features of which are described in detail and claimed in a copending application entitled "Cam-Actuated Intermittent Movement," Serial No. 218,361, filed on March 30, 1951. For the purposes of the present invention the cam mechanism 50 can be considered to represent a typical means for driving a claw arm from a rotating shaft, whether depending for its action upon cams, eccentrics or linkages of other types.

In the present illustrative form of mechanism 50, shaft 14 carries a cam 52, having a relatively small cam throw. Cam 52 works between follower surfaces 54 which are formed by the opposed edges of a slotted aperture 55 in claw arm plate 30, and which are seen to be generally parallel, but curved with center of curvature at a point 68, so that they are oblique to the longitudinal axis of claw arm 30. A second cam 56 is fixed on shaft 14 outwardly of cam 52, and has a relatively larger throw than the latter. Cam 56 engages follower surfaces 58 which are parallel to the longitudinal claw arm axis and are preferably formed by blocks of impregnated fiber or the like, rigidly mounted on claw arm plate 30 as by plate flanges 60 and rivets 62.

Motion of claw arm plate 30 is confined to the plane of the plate by guide surfaces, which, as illustrated, comprise the flat face 64 of frame portion 10, which slidingly engages the inner face of the claw arm, and the circular shoulder 66 on the inner face of cam 56 (or, alternatively, the inner cam face itself), which similarly engages the outer claw arm face immediately surrounding the aperture 55. The rearward end of claw arm 30 is preferably also guided laterally against face 64 by pivot block 38.

Both of cams 52 and 56 are preferably of the type which provide a relatively small stroke angle (angle of cam rotation during which the cam stroke takes place) and a relatively large dwell angle. As illustrated, the dwell angles of both cams are approximately 120°, and overlap with each other, leading to a claw path of the type indicated in Fig. 4, comprising a four-sided figure with sharp corners between the sides.

A characteristic of the illustrated cam mechanism 50 is to produce a claw arm motion which during the pull-down stroke (AB in Fig. 4) comprises primarily a rotation of the entire claw arm in its own plane about a definite point, which is approximately the point 68. The claw teeth 32 are made in the form of sprocket teeth arranged along a curve having point 68 as its center of curvature. Film guide 16 is similarly curved, with its center of curvature at 68. The characteristics of the illustrated mechanism described in this and the preceding paragraph are illustrative, and are not necessary for carrying out the present invention; and form part of the subject matter of the co-pending application referred to before.

Lubrication is supplied to the moving parts of mechanism 50 in any suitable manner, such as by an oil saturated wick, shown as a porous pad 70 so supported on a light and preferably resilient frame 72 that its upper portion contacts the outer peripheral portion of cam 56 as the latter rotates (Fig. 3). Oil is picked up by the cam and distributed from it to other moving parts of the mechanism. Oil dripping from the mechanism collects at the bottom of chamber 79 (see below) and reenters the lower portion of wick 70, which lies along the chamber floor. Thus a relatively small quantity of oil provides a continuous circulation of lubricant to the mechanism.

An important feature of the present invention is the means, illustratively shown in the drawings, by which lubricant is retained in an oil chamber 79 enclosing mechanism 50. In the present embodiment that chamber is formed by walls which include the front face 64 of frame 10 and the inner surface of a cover member 76, which comprises a flat front wall 78 with side walls 80 adapted to fit against a suitable face 82 on frame 10. Cover 76 is held in place by screws 84, and is preferably sealed against face 82 by a gasket 85. As illustrated, oil pad frame 72 is mounted at 73 in cover 76. Since film-engaging claws 32 must necessarily be outside of oil chamber 79, claw arm 30, which is in the present embodiment, represents any linkage by which motion is imparted from mechanism 50 to the claws, must pass through the chamber wall via an aperture of some type which permits the claw arm motion. The problem of sealing that aperture against oil leakage is particularly difficult in a movement which provides positive claw action and in which the claw arm moves in a plane and not merely along a line.

That problem is solved in accordance with the present invention by providing oil chamber 79 with an apertured wall 86 parallel to the plane of claw arm motion, and by forming the claw arm with a transversely projecting portion 88 adapted to extend through the aperture 90 in that wall. The forwardly extending, claw carrying arm 34 is rigidly connected to the transverse arm portion 88. In the present illustrative embodiment, arm 34 is parallel to the plane of claw arm motion and comprises, with the main body of the claw arm within chamber 79 and with transverse portion 88, a unitary structure formed from a single piece of sheet metal. Arm 34 thus comprises an offset portion of the main claw arm, the offset being provided by transverse portion 88. Although that detailed structure is preferred, it is not necessary for carrying out the invention. Aperture 90 is large enough to provide clearance for arm portion 88 in all positions of its cyclic motion. The aperture is sealed by a diaphragm 96 securely mounted on the claw arm and extending generally in a plane parallel to the plane of claw arm motion. Diaphragm 96 closely surrounds the portion 88 of the claw arm forming a tight seal therewith at 98. It is preferred that the central portion of the diaphragm be rigidly secured to arm 30, as by solder, but that is not necessary, so long as its position is so defined as to insure clearance at 100 between the outer portion of the diaphragm and the main body of the claw arm; and so long as the joint at 98 is relatively tight against oil leakage. The peripheral portion of the diaphragm contacts wall 86 along an effectively continuous line at 97 surrounding the aperture. In speaking of the contact at 97 as a line contact, it is to be understood that the contact actually extends over a surface of finite width. In the preferred form illustrated, that contact surface is formed by the flanged edge of diaphragm 96, and its width is therefore the thickness of the diaphragm. However, a much wider contact surface can be provided, and is intended to be included within the scope of the invention.

In preferred form, diaphragm 96 is relatively rigid in its own plane, so that the diaphragm edge 97 moves over the wall surface 86 in a cyclic pattern similar to that of claw arm portion 88. On the other hand the diaphragm is relatively flexible normal to its plane, and is mounted on claw arm 30 in such relation to wall 86 that its contacting edge 97 exerts a light elastic pressure against the wall. That insures effectively continuous contact along the entire periphery of the diaphragm. In practice it is preferred to shape the diaphragm with circumferential corrugations as at 99 to improve resiliency. It is found that a pressure at 97 corresponding to a transverse deformation of the diaphragm through only a few thousandths of an inch is sufficient to provide a satisfactory seal, and contributes only negligibly to the sum of all forces acting on the claw arm. By forming the diaphragm of light spring stock the inertia which it adds to the claw arm can be made very small.

Intermittent claw type movements of different designs may have widely differing patterns of claw motion, of which the pattern in Fig. 4 may be considered to be broadly typical. The pattern of motion of a point on the claw arm between the claw and the arm-actuating mechanism 50, such for example as point 98, is ordinarily, but not necessarily, generally similar to the claw pattern, the precise differences between two such patterns varying widely with different types of mechanism. In the present instance, the motion of intermediate portion 88 of the claw arm follows a pattern like that in Fig. 5. Hence points on diaphragm 96 follow similar patterns, the exact size and form of the pattern varying somewhat from one point to another of the diaphragm.

When the motion patterns of all points of diaphragm 96 are generally similar in size and form (which is not necessarily the case) certain useful generalizations can be made, and are conveniently expressed in terms of an average motion pattern for the whole diaphragm, for example, the pattern of that portion of the claw arm which lies within wall aperture 90. Aperture 90 must be larger than that average motion pattern after its overall dimensions are increased by the corresponding dimensions of the cross-sectional area of arm 30 in the plane of the aperture. Also, the plane figure formed by line contact 97 between diaphragm 96 and wall 86 must be larger than that initial motion pattern after its overall dimensions have been increased by the corresponding dimensions of aperture 90. And finally, the flat wall surface 86 must be larger than that initial motion pattern, similarly increased by the dimensions of diaphragm 96 (or, more exactly, of the line contact 97).

The margin by which each of those conditions must be met can be made quite small, particularly if space is at a premium, but must of course in practice take account of any differences of motion pattern at different points of the structure. It is preferred to provide an ample margin, and it will be noted that in each of the four extreme positions of the mechanism that are illustrated (Figs. 2 and 3) there is ample clearance between the claw arm and aperture 90, between line contact 97 and aperture 90, and between line contact 97 and the outer boundary of wall surface 86.

In some claw movements, particularly those using ratchet type claws, the motion pattern of the arm portion 88 within aperture 90 may form a line rather than an area. The present invention can be used with such movements as well as with those of the more general type illustrated. Furthermore, its use is not dependent upon the presence of only a single driving shaft in the actuating mechanism of the movement, but includes any type of claw arm actuation which leads to motion confined substantially to a plane.

When the film to be used has perforations along both its edges, it is preferable to provide claw engagement with both sets of perforations. That can be done, for example, by duplication of the mechanism already described to provide a separate claw arm 30 and actuating mechanism 50 for each set of film perforations. It is then convenient to drive both mechanisms 50 from a common drive shaft, the transverse claw arm portions 88 protruding in opposite directions through apertures 90 in opposed parallel walls 86.

Alternatively, a single claw arm 130 (Fig. 6), actuated by a single mechanism, such as 50, is provided with two oppositely disposed legs 134 and 134a which carry claws 132, 132a adapted to engage the respective sets of film perforations 124, 124a. The two legs have oppositely extending transverse portions 188 protruding through apertures 190 in opposed parallel walls 186 of the oil chamber 179. Each aperture 190 is then sealed by a diaphragm 196 (shown in Fig. 6 without corrugations) mounted on the claw arm in the manner already described. An advantage of such an arrangement is that the reaction forces on the claw arm from the pressure between the diaphragms and the respective walls 186 balance each other, reducing the friction between the claw arm and the guiding surfaces which define its plane of action.

We claim:

In an intermittent film movement of the type that includes a film guide, an elongated claw arm carrying a film engaging claw at one end and slidingly pivoted for swinging movement about a pivot axis transverse of the length of the claw arm and for longitudinal reciprocation normal to that pivot axis, and driving mechanism for driving the claw arm in a periodic cycle of swinging and reciprocating movements, said driving mechanism including a cam revoluble about a cam axis parallel to the pivot axis; lubricating means for the said driving mechanism, comprising in combination structure forming a lubricant containing chamber enclosing the driving mechanism, the said structure including a chamber wall having a flat inner face that is normal to the pivot axis and having an aperture that extends transversely through the said chamber wall within the area of the said inner face, the claw arm including an inner longitudinally extending portion positioned within the lubricant chamber and directly engaged by the cam of the driving mechanism, a transverse portion rigidly mounted on the said inner portion and extending transversely through the said aperture in the chamber wall, and an outer longitudinally extending portion rigidly mounted on the transverse portion outside of the lubricant chamber and carrying at its free end the film engaging claw, the said aperture in the chamber wall being sufficiently large to allow free movement of the transverse arm portion as the claw arm is driven in its said swinging and reciprocating movements, and sealing means for the aperture comprising a resilient diaphragm surrounding the transverse portion of the claw arm and having its central portion rigidly connected thereto in hermetically sealed relation, the diaphragm lying substantially in a plane normal to the pivot axis, and the circumferential rim of the diaphragm slidingly contacting the said flat inner face of the chamber wall along a continuous contact line that surrounds the aperture in all positions assumed by the claw arm in its periodic cycle of movement, all whereby the single sliding contact between the diaphragm rim and the flat face of the chamber wall accommodates both the swinging and the reciprocating movements of the claw arm.

VERNON J. EVRAETS.
GEORGE A. MITCHELL.

REFERENCES CITED

The following references are of record in the file of this patent:

UNITED STATES PATENTS

| Number | Name | Date |
|---|---|---|
| 1,400,877 | Hillman | Dec. 20, 1921 |
| 1,450,343 | Wescott | Apr. 3, 1923 |
| 1,716,377 | Grant | June 11, 1929 |
| 1,823,804 | Spreen | Sept. 15, 1931 |
| 1,967,842 | Raviola | July 24, 1934 |
| 2,065,834 | Sivennes | Dec. 29, 1936 |
| 2,417,108 | Guibert et al. | Mar. 11, 1947 |
| 2,427,568 | Nemeth | Sept. 16, 1947 |